(12) United States Patent
Ghanbari

(10) Patent No.: US 7,869,517 B2
(45) Date of Patent: Jan. 11, 2011

(54) VIDEO QUALITY MEASUREMENT

(75) Inventor: Mohammed Ghanbari, Colchester (GB)

(73) Assignee: British Telecommunications public limited company, London (GB)

( * ) Notice: Subject to any disclaimer, the term of this patent is extended or adjusted under 35 U.S.C. 154(b) by 1630 days.

(21) Appl. No.: 10/536,386

(22) PCT Filed: Nov. 18, 2003

(86) PCT No.: PCT/GB03/05002

§ 371 (c)(1),
(2), (4) Date: May 26, 2005

(87) PCT Pub. No.: WO2004/054274

PCT Pub. Date: Jun. 24, 2004

(65) Prior Publication Data

US 2005/0281333 A1      Dec. 22, 2005

(30) Foreign Application Priority Data

Dec. 6, 2002   (GB) ................... 0228556.7

(51) Int. Cl.
*H04B 1/66* (2006.01)
(52) U.S. Cl. .............. 375/240.16; 375/240.03; 375/240.2; 375/240.04; 375/240.25; 375/240.26; 382/251; 382/250; 382/233; 382/235
(58) Field of Classification Search ........... 375/240.16, 375/240.03, 240.2, 240.04, 240.25, 240.26, 375/240.15; 382/251, 250, 233, 235
See application file for complete search history.

(56) References Cited

U.S. PATENT DOCUMENTS

| | | | |
|---|---|---|---|
| 5,654,759 A * | 8/1997 | Augenbraun et al. ... | 375/240.03 |
| 6,011,663 A | 1/2000 | Inoue et al. | |
| 6,810,083 B2 * | 10/2004 | Chen et al. ............ | 375/240.25 |
| 6,898,321 B1 * | 5/2005 | Knee et al. ................. | 382/235 |
| 2002/0181598 A1 | 12/2002 | Vetro et al. | |

FOREIGN PATENT DOCUMENTS

| | | |
|---|---|---|
| EP | 0827346 A2 | 3/1998 |
| EP | 0869684 A2 | 10/1998 |
| EP | 0948206 A2 | 10/1999 |
| GB | 2326791 | 12/1998 |
| JP | 2001-231017 | 8/2001 |
| WO | WO 00/22834 | 4/2000 |

OTHER PUBLICATIONS

Office Action dated Feb. 5, 2009 in EP 03 812 607.4.

(Continued)

*Primary Examiner*—Shawn An
(74) *Attorney, Agent, or Firm*—Nixon & Vanderhye P.C.

(57) ABSTRACT

A measure of quality of compressed video signals is obtained without reference to the original uncompressed version, but generated directly from the coded image parameters, thereby avoiding the need to decode the compressed signal. A first measure is generated from the quantizer step size and a second measure is generated as a function of the number of blocks in the picture that have only one transform coefficient. The two measures are combined. Adjustments may be made to the step-size based measure to compensate for spatial or temporal masking effects.

8 Claims, 6 Drawing Sheets

OTHER PUBLICATIONS

Japanese Office Action dated Feb. 27, 2009 in JP 2004-558198 with Partial English translation.

First Notice of Office Action in CN 200380105233.8 dated Nov. 7, 2008 in English and English translation of text of Chinese Office Action.

Tan, K.T. et al., A Multi-Metric Objective Picture-Quality Measurement Model for MPEG Video, IEEE Trans. on Circuits and Systems for Video Technology, Oct. 2000, vol. 10, No. 7, pp. 1208-1213.

Knee, Mike: A Single-Ended Picture Quality Measure for MPEG2, http://www.broadcastpapers.com/sigdis/Snell&WilcoxQualityMeasure.doc, downloaded Dec. 3, 2002.

The Picture Appraisal Rating (PAR)—A single-ended picture quality measure for MPEG-2, http://www.snellwilcox.com/products/mosalina/content/downloads/parpaper.pdf, downloaded Dec. 3, 2002.

\* cited by examiner

VIDEO QUALITY MEASUREMENT

This application is the US national phase of international application PCT/GB2003/005002 filed 18 Nov. 2003 which designated the U.S. and claims benefit of GB 0228556.7, dated 6 Dec. 2002, the entire content of which is hereby incorporated by reference.

BACKGROUND

1. Technical Field

This invention is concerned with video quality measurement, and more particularly with the assessment of picture quality without reference to a copy of the original undistorted pictures.

2. Related Art

While others have provided various types of video quality measurements (e.g., see U.S. Pat. No. 6,810,083 —Chen, et al.), such sometimes require excess resources and/or provide less than optimum meaningful results.

BRIEF SUMMARY

According to one aspect of the present invention there is provided a method of generating a measure of quality for a video signal that has been encoded using a compression algorithm utilising a variable quantiser step size and a two-dimensional transform, such that the encoded signal includes a quantiser step size parameter and, for blocks of the picture, transform coefficients, the method comprising:

a) generating a first quality measure which is a function of said quantiser step size parameter;

b) generating a second quality measure which is a function of the number of blocks having a single transform coefficient; and c) combining the first and second measures.

In another aspect, the invention provides an apparatus for generating a measure of quality for a video signal that has been encoded using a compression algorithm utilising a variable quantiser step size and a two-dimensional transform, such that the encoded signal includes a quantiser step size parameter and, for blocks of the picture, transform coefficients, the apparatus comprising:

a) means for generating a first quality measure which is a function of said quantiser step size parameter;

b) means for generating a second quality measure which is a function of the number of blocks having a single transform coefficient; and c) means for combining the first and second measures.

Other aspects of the invention are defined in the claims.

BRIEF DESCRIPTION OF THE DRAWINGS

Some embodiments of the invention will now be described, by way of example, with reference to the accompanying drawings, in which.

DETAILED DESCRIPTION OF EXEMPLARY EMBODIMENTS

In principle the measurement process used is applicable generally to video signals that have been encoded using compression techniques using transform coding and having a variable quantiser step size. The version to be described however is designed for use with signals encoded in accordance with the MPEG-2 standard. (Although the version to be described is based on MPEG-2 video codec, it also applies the other DCT based standard codecs, such as H.261, H.263, MPEG-4 (frame based) etc.)

The measurement method is of the non-intrusive or "no-reference" type—that is, it does not need to have access to a copy of the original signal. Moreover it aims to perform its measurements without the need to decode the received signals into video signals; rather, it utilises the parameters contained in the received MPEG stream.

Figure 1:
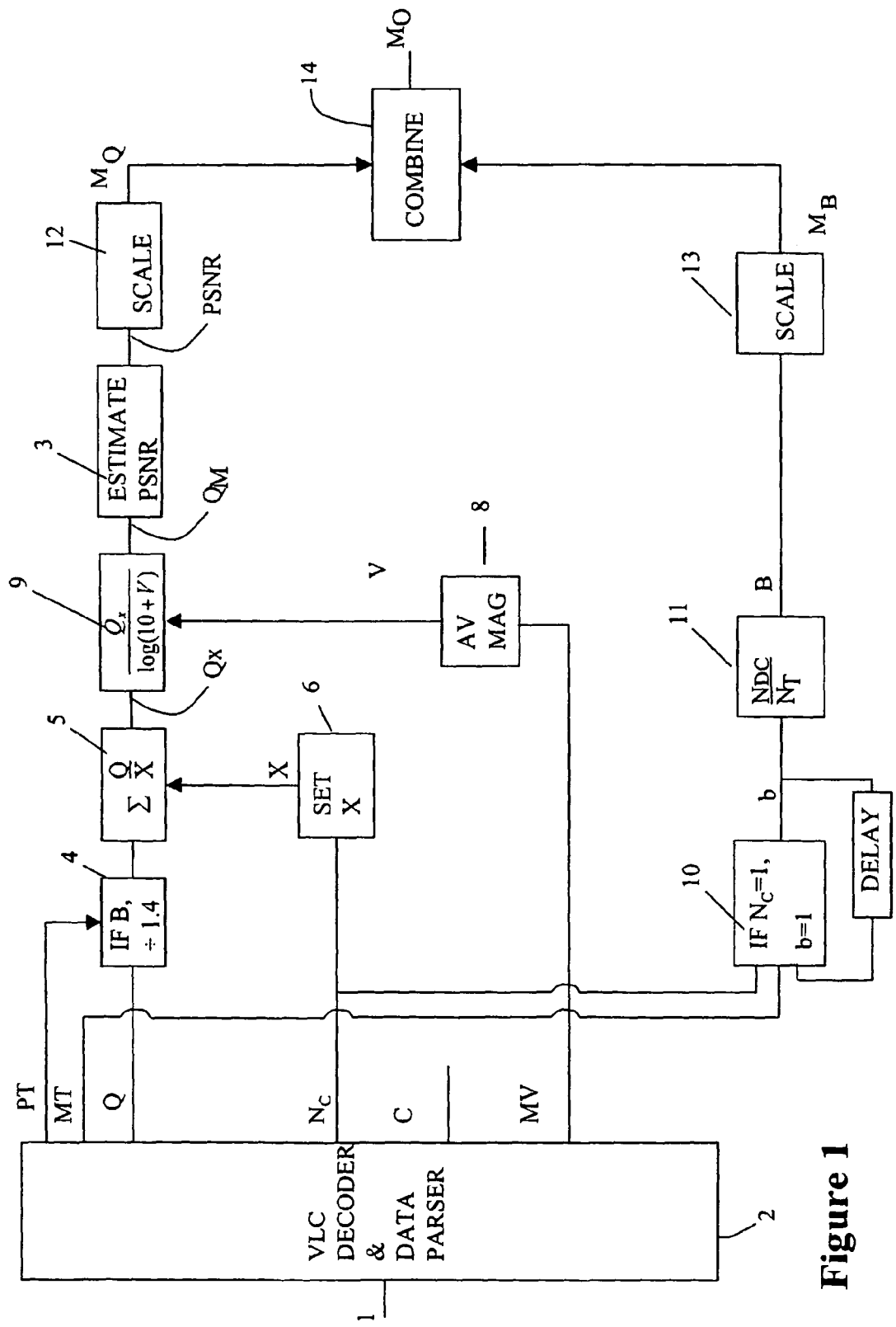
FIG. 1 is a block diagram of one example of an apparatus for measuring the quality of a received video signal.

In the apparatus shown in FIG. 1, the incoming signal is received at an input 1 and passes to a VLC decoder and data parser 2 which decodes the variable-length codes and outputs the following parameters:

(a) for each picture:

Picture type PT (=I, P or B)

(b) for each macroblock (MB) into which the picture is divided:

Macroblock type MT (e.g. INTRA or INTER, skipped, not-coded, etc.) Quantiser step size Q (c) for each block within the macroblock:

Number of coefficients $N_C$

Coefficients C

Motion vectors MV.

There are two analysis paths in the apparatus, which serve to estimate the peak signal-to-noise ratio (PSNR) of the signal and the "blockiness" of the signal, respectively. The elements 3 to 14 could be implemented by individual hardware elements but a more convenient implementation is to perform all those stages using a suitably programmed processor.

PSNR Estimation

This employs the quantiser step sizes Q. After some adjustments (to be described later) the adjusted step size $Q_M$ is used at 3 to calculate the estimated PSNR in accordance with $$PSNR = 10 \log\left[\frac{255^2}{\left(\frac{Q_M^2}{12}\right)}\right] = 59 - 20 \log Q_M$$

The derivation of this equation, and of a more sophisticated alternative, will be given below.

The adjustments referred to consist of three stages:

Stage 4: The quantiser step sizes for B-pictures are adjusted by division by 1.4.

Stage 5: The quantiser step-sizes are adjusted to take into account spatial masking effects, employing a spatial complexity factor X, generated by counting the number of non-zero coefficients $N_C$ in each block and assigning values of X (Stage 6) as follows.

$N_C < 3: X = 1$ $3 \leq N_C < 6 \; X = 1.2$ $6 \leq N_C < 10 \; X = 1.4$ $10 \leq N_C < 15 \; X = 1.6$ $15 \leq N_C \; X = 1.8$ An adjusted value $Q_X$ is then (at 5) computed as $$Q_X = \sum_{frame} \frac{Q}{X}$$

Note also that at this point the opportunity has been taken to sum these values over the whole frame.

Next, there is a further adjustment to take account of temporal masking. The motion vectors are used (Stage 8) to derive the motion magnitude V (adjusted for block type—see below for details) averaged over the whole frame.

The adjusted Q is then (Stage 9)

$$Q_M = \frac{Q_X}{\log_{10}(10 + V)}$$

Note that the formula given above for the PSNR calculation assumes a uniform probability distribution function for the quantiser step size. Whilst this is a reasonable assumption for the DC coefficients of an INTRA block it is less accurate for other coefficients. An alternative formula for a non-uniform probability distribution is derived in the discussion below (Equation (7)): if this is used then preferably the parameter a of the pdf is switched according to the type of frame (I, P or B). Note that (on the basis that the DC coefficients of INTRA blocks are in the minority) we would prefer to use Equation 7 for all coefficients, and this is found to give good results in practice. If one wished to use both distributions one would need to avoid summing over the whole frame at stage 5 and use a formula for PSNR which would then cater for combining Q values with different pdfs.

Blockiness Estimation

The simplest form of this is to make use of the fact that, within an INTRA-coded macroblock, a block that has only one coefficient will cause a blocky appearance in the picture, and calculate the percentage of blocks within the frame that meet this criterion.

Thus at stage 10 each block is marked b=1 (blocky) or b=0 (not blocky), and then (Stage 11) the number $N_{DC}$ of such blocks is counted, as is the total number $N_T$ of coded blocks, and the quotient $B=N_{DC}/N_T$ calculated.

An enhanced blockiness measure might also take account of the fact that an INTER-coded block for which all coefficients are zero also results in blockiness if the earlier picture (which a decoder will copy from) is blocky at that position. Thus, Stage 10 may also receive the previous value of b via a delay (the duration of which corresponds to the delay between the earlier frame and the one encoded, which will vary, for example for MPEG with two B-frames for each P-frame it would be three frame periods).

In this case the formula for stage 10 becomes:

If ($MT$=INTRA and $N$=1) or ($MT$=INTER and $N$=0 and $b_{-1}$=1) THEN b=1; Otherwise b=0.

(where $b_{-1}$ is the previous-frame value of b for the same block position).

Combination

In order to combine the PSNR and blockiness measures it is firstly necessary to convert these measures into measurements on the same scale (Stages 12,13). A convenient way to do this is to translate the measures into measures $M_Q$ and $M_B$ on an arbitrary scale from, say, 0 to 9 (0=very poor and 9=very good), using a conversion table as used for the complexity measure X, either by dividing the possible range of PSNR or B into equal steps, or alternatively with an empirical table based on viewing tests.

Having obtained the two measures $M_Q$ and $M_B$ on the same scale, they are combined into a single measure. The basis on which this is done is that in the event of strong blockiness for a particular frame, then the output measure M from Stage 14 is simply the blockiness measure $M_B$. If on the other hand the blockiness measure is low, then the output measure $M_O$ is the PSNR measure $M_Q$.

e.g.

If $M_B > 6$ $M_O = M_Q$

If $M_B \leq 6$ $M_O = M_B$

Discussion

The following discussion explains the rationale behind the above-described method, gives derivations of the equations and some experimental results, and describes some modifications and improvements.

The aim of this work was to demonstrate how the required data from the compressed bitstream can be extracted and used as a video quality metric (VQM), without a reference. It is shown that the most important parameter for VQM is the quantiser step size, which can be extracted per macroblock (MB). To include the human visual system, this value is modified with the spatio-temporal image content. Here the spatial content is derived from the number of AC coefficients of the coded MBs, and the temporal activity from the motion vectors. To consider the contrast sensitivity, in the picture, the DC coefficients of the INTRA coded blocks may also be used. Finally, in cases of severe distortion, picture blockiness, which is the dominant distortion, can be extracted. This is done by taking the percentage of INTRA coded blocks with DC as the only non-zero coefficient in the block, over the entire coded blocks. This value is modulated with the number of skipped ands non-coded MBs, to improve reliability of detection. These are all extracted from the compressed bitstream.

Currently an objective measure of video quality is carried out under three main categories: Full-Reference, Reduced-Reference and No-Reference models. It is believed that the No-Reference model has great potential for being simpler than the other two and is most likely to be used for quality assessment or monitoring throughout networks, where access to the reference data (either full or reduced) is costly or not possible. Thus it is of vital importance to see how the processing complexity of the No-reference model can be reduced without sacrificing its assessment accuracy.

One way of simplifying the no-reference model complexity is to extract the model parameters directly from the bitstream, without decoding the pictures fully. In fact, most of the current no-reference models work on the decoded pictures, to extract the required model parameters. Thus, the degree of relative simplicity, or processing efficiency of these two methods of no-reference models can be the amount of individual processing operations needed under each scheme.

In general, no-reference model parameters include: motion, spatial or contextual details, edges, contrast sensitivity, etc. Generating each of these from the decoded pictures can involve heavy processing. For example, estimation of motion vectors at the encoders normally takes about 60% of the processing power of the encoders (note that encoders might test a variety of motion estimation modes, while as a measure of speed, only one mode is enough, hence the percentage can be less than 60%, but still can be high). Considering that video encoders are 3-5 times more demanding of processing than the video decoders, then one can say that just the motion estimation can be 2-3 times more demanding of processing than decoding a picture. Hence derivation of no-reference model parameters (e.g. motion, spatial or contextual details, edges, contrast sensitivity, blockiness) on the decoded pictures can be several times (e.g. 5) more demanding of processing than decoding a picture. The exact ratio depends on how complex the implementation of each of these may be.

On the other hand, deriving the model parameters from the bitstream, considering that the required information is already embedded in the bitstream, can be a fraction of the processing required to decode a picture. Here, what is needed is the inverse VLC (very fast, using table look ups), which is a very minute fraction of decoding a picture. Hence the complexity of extracting model parameters from the bitstream compared with those derived from the decoded pictures is very negligible (e.g. 5-10% or even lower), and the proposed method can be used for online monitoring of video quality at a marginal cost.

In the full reference model for picture quality assessment, the encoding distortion or the Peak Signal-to-Noise Ratio (PSNR) is often used. Although it can be argued that the PSNR does not exactly represent the human perception of image quality (distortion), nevertheless it is a very strong indicator. In fact all the known full reference models somehow use the difference (distortion) between the original and the processed images to derive some other perceptually optimised parameters.

Now if we assume that PSNR can be an indicator of quality, then the question is how in the no-reference model without any reference picture it can be used as a measure of quality (distortion). Looking at the way the PSNR is defined, it will become clear that this can be done.

In the Full reference model the PSNR is defined as:

$$PSNR = 10 \log\left[\frac{255^2}{\varepsilon^2}\right]$$

Figure 2:
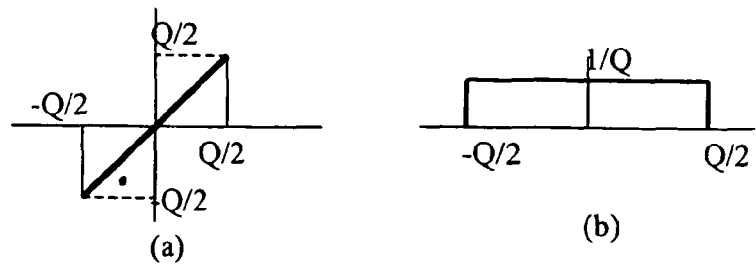
FIG. 2 illustrates graphically characteristics of quantisation distortion.

In this equation $\varepsilon^2$ is the mean squared error between the original and the processed picture. If the coding distortion is just due to the quantisation distortion (which is the case in video coding) then there is a direct relation between the mean squared error, $\varepsilon^2$, and the quantiser step size Q. For example, for a uniformly distributed signal, with a quantiser step size Q, the mean squared quantisation distortion is as shown in FIG. 2, where (a) shows the distribution of quantisation distortion and (b) shows the probability density function of the coefficient within the quantised range.

The average distortion is calculated as:

$$\varepsilon^2 = \frac{1}{Q}\int_{-Q/2}^{Q/2} x^2\, dx = \frac{Q^2}{12}$$

Thus the PSNR (in dB) in terms of the quantiser step size Q can be defined as:

$$PSNR = 10 \log\left[\frac{255^2}{\left(\frac{Q^2}{12}\right)}\right] = 59 - 20 \log Q \quad (1)$$

It should be noted that, in a video codec, quantisation is applied to the transform coefficients, but the measured distortion is between the original and the decoded pixels. However, since the DCT transform is a linear operator, due to the *Parseval Theorem,* energy in the transform and pixel domains are equal (this can change by a constant factor, depending on the scaling of the transform coefficients in the forward and inverse transforms).

Figure 3:
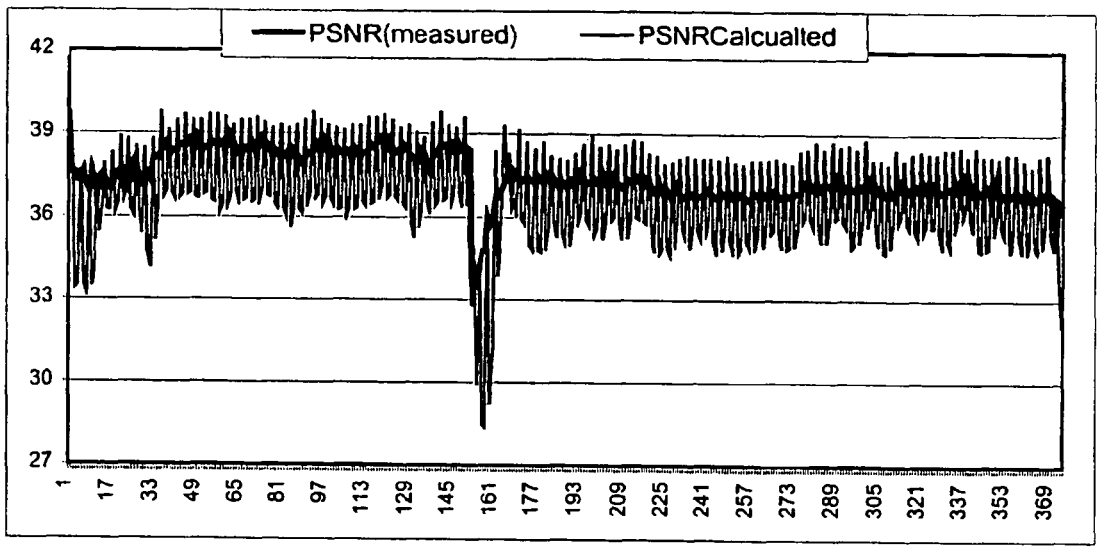
FIGS. 3 to 6 are graphs illustrating test results.
Figure 4:
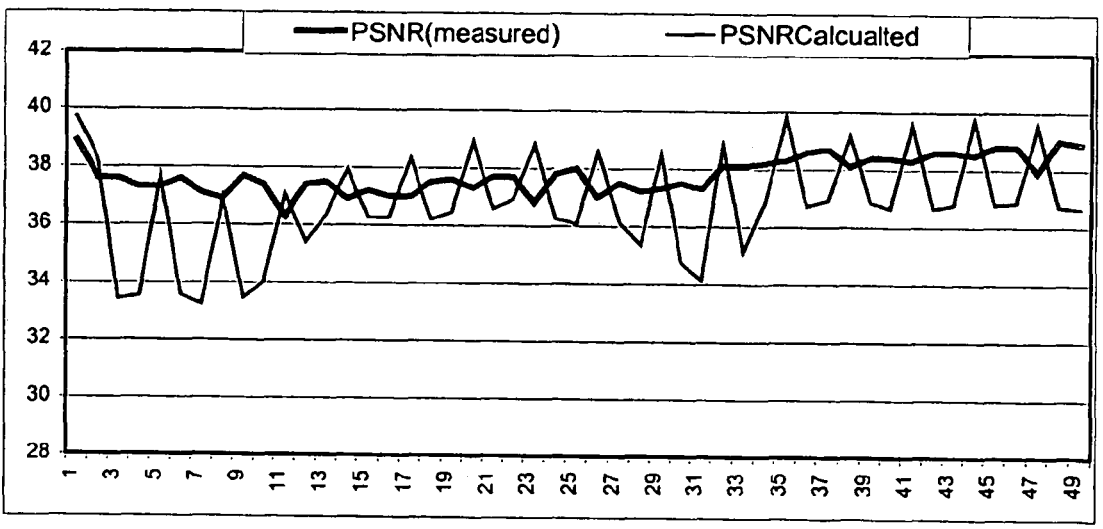
Figure 5:
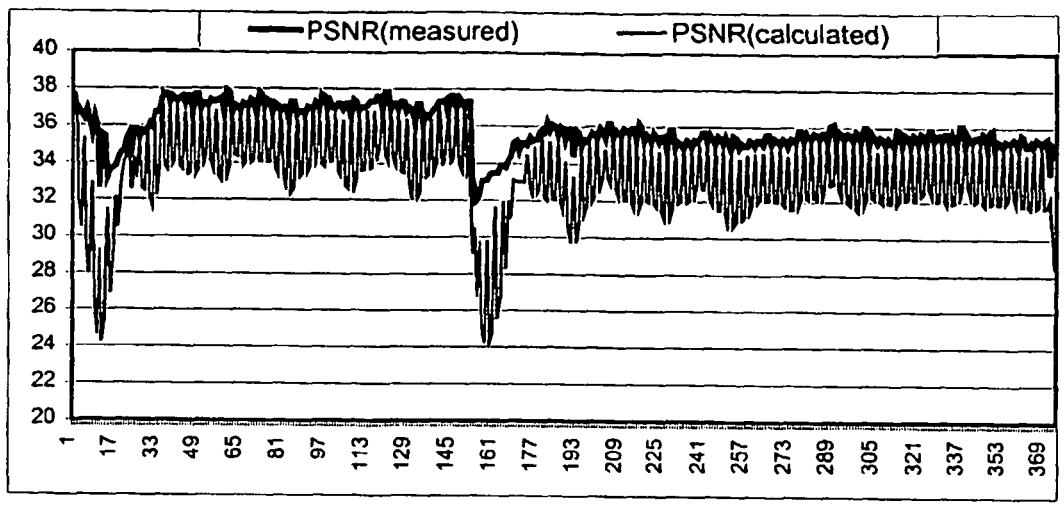
Figure 6:
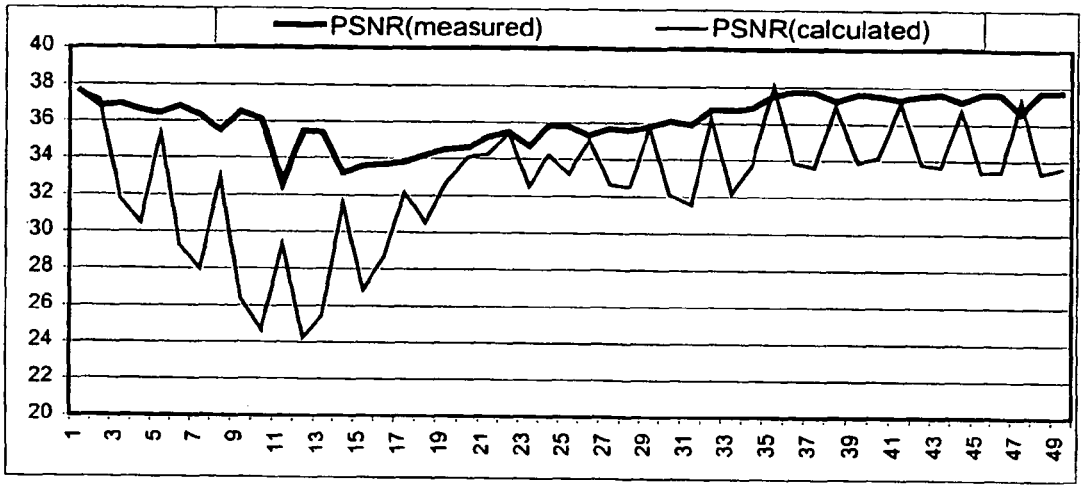

FIG. 3 compares the measured PSNR versus the calculated PSNR from the quantiser step size, using Equation (1) (i.e. assuming a uniform pdf), for a test sequence "New York" at 2 Mbit/s. As we see, despite the very crude approximation of the model, the calculated PSNR very closely approximates the measured PSNR. However, while the measured PSNR is stable and smooth, the calculated PSNR is oscillating between the values of anchor (I, P) pictures and the B-pictures. To analyse this behaviour, FIG. 4 shows a few frames of the sequence, at a finer scale. This Figure shows that for B-pictures the calculated PSNR is less than the measured values, and for P and I pictures is the opposite. The difference gets larger for larger quantiser step sizes (lower bit rates) as shown in FIGS. 5 and 6 for the same sequence at 1.5 Mbit/s.

Of course, one is not expecting that the two methods should give exactly equal values. However, the reason that the calculated PSNR values for B-pictures are less than those for I- and P-pictures, while their measured values are almost equal, are due two factors. First, the assumption of uniform quantisation distortions for the coefficients is not correct. The only coefficient that has almost uniform pdf is the DC coefficient of the INTRA coded blocks. Thus for the AC coefficients of even I-pictures, which have non-uniform amplitude distributions, Equation (1) could with advantage be modified with a known non-uniform density function, f(x), rather than uniform distribution of 1/Q.

Note that, although the distributions of coefficients are non-uniform, the degree of non-uniformity can vary from picture-type to picture-type. In B-pictures due to efficient motion compensation, the distribution is very steep, and most of the coefficients are near to zero. This should preferably be taken into account too.

Second, at the encoders, the quantiser step sizes for B-pictures are deliberately increased for two reasons. First, as we have seen, B-pictures are efficiently motion compensated, so they are usually-small, no matter what the value of quantiser step size. But when they are large to be coded, then it does not make any difference if they are relatively coarsely quantised. The second reason is that since B-pictures are not used by the encoder's prediction loop, then, even if they are distorted, this distortion does not propagate into the following pictures. This is not the case with the I- and P-pictures, where any savings in bits by their coarse quantisation, have to be paid back later.

Consider now the calculation of estimated PSNR assuming a non-uniform density function. The actual mean squared error due to quantisation should be $$\varepsilon^2 = \int_{-Q/2}^{Q/2} f(x) x^2\, dx \quad (2)$$

Figure 7:
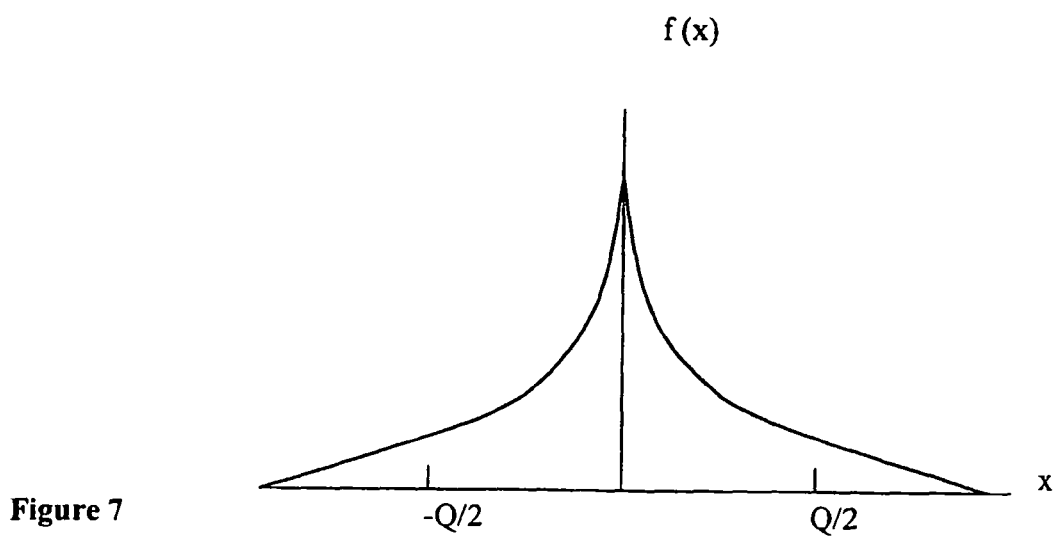
FIG. 7 illustrates graphically a coefficient amplitude distribution.

To derive a closed solution for this integral, we assume the coefficients have a non-uniform distribution of the type $$f(x) = \frac{\beta}{1 + \alpha |x|} \quad (3)$$

which is plotted in FIG. 7.

Where $\alpha$ is the rate of decay of the density function and $\beta$ is a weighting factor, making sure the pdf is normalised to unity. That is $$\int_{-Q/2}^{Q/2} f(x)dx = 1$$

Thus $\beta$ can be found in terms of $\alpha$ $$\int_0^{Q/2} \frac{\beta}{1+\alpha x} dx = 1 \text{ That results in } \beta = \frac{\alpha}{2\ln\left(1+\frac{Q\alpha}{2}\right)} \quad (4)$$

With this non-uniform pdf, the mean squared error is:

$$\varepsilon^2 = \int_{-Q/2}^{0} \frac{\beta x^2}{1-\alpha x} dx + \int_0^{Q/2} \frac{\beta x^2}{1+\alpha x} dx = 2\int_0^{Q/2} \frac{\beta x^2}{1+\alpha x} dx$$

The integral can be simplified by letting $\alpha x = u$, then $$\varepsilon^2 = \frac{2\beta}{\alpha^3} \int \frac{u^2}{1+u} du$$

after simple manipulations and integration, it is:

$$\varepsilon^2 = \frac{2\beta}{\alpha^3} \left[ \frac{1}{2}(u-1)^2 + \ln(u+1) \right]_0^{Q\alpha/2} \quad (5)$$

substituting the integral limits and the value of $\beta$ from Equation (4), the value of the mean squared distortion is $$\varepsilon^2 = \frac{1}{\alpha^2 \ln\left(1+\frac{Q\alpha}{2}\right)} \left[ \frac{Q^2\alpha^2}{8} - \frac{Q\alpha}{2} + \ln\left(1+\frac{Q\alpha}{2}\right) \right] \quad (6)$$

and the PSNR with this distortion is:

$$PSNR = 48.13 - 10\log\left\{ \frac{1}{\alpha^2\ln\left(1+\frac{Q\alpha}{2}\right)} \left[ \frac{Q^2\alpha^2}{8} - \frac{Q\alpha}{2} + \ln\left(1+\frac{Q\alpha}{2}\right) \right] \right\} \quad (7)$$

Figure 8:
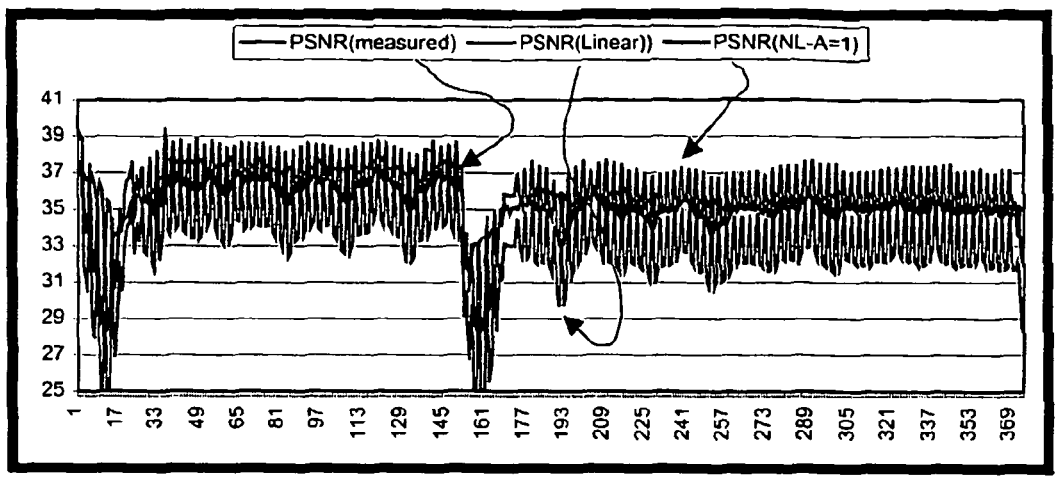
FIGS. 8 to 14 are graphs illustrating further test results.

FIG. 8 compares this new PSNR with the measured value as well as the PSNR with the uniform density function, for the New York sequence at 1.5 Mbit/s. In this figure it is assumed $\alpha=1$ for all picture types, which is not an ideal choice, but for the sake of simplicity we have chosen this. In reality $\alpha$ should be chosen differently for different picture types, and for each type to fit the measured PSNR. It should also be larger for lower bit rates (larger expected quantiser step sizes).

Figure 9:
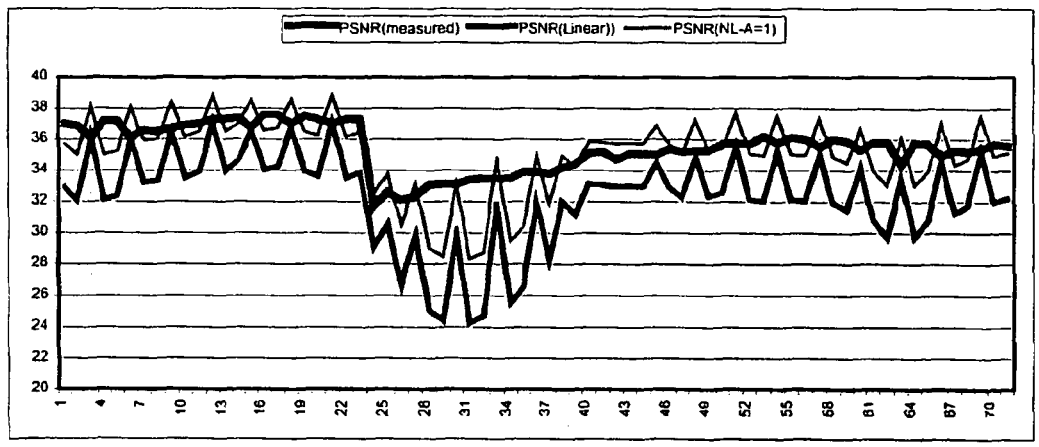

FIG. 9 shows the PSNR at a finer scale. As we see, despite the good fit, there are still some oscillations. That is the PSNR of the calculated B-pictures show some dips compared with the P and I-pictures.

This oscillation is due to the fact that encoders choose larger quantiser step sizes for B pictures compared with those of I and P pictures. This is implemented into the bit-rate allocation algorithm of the encoder through the complexity index, to assign fewer bits to B-pictures by a factor of 1.4. Hence since the assigned bits are reduced by 1.4, then the quantiser step size for B-pictures, $Q_B$, are raised by this factor. Therefore, in the PSNR calculation, we divide them by 1.4, as already described for Step 4 in FIG. 1 (note if $Q_B$ has reached its saturation value of 112, we should not divide, since at this poor picture quality, quantiser step sizes of I and P pictures might have also been saturated).

Figure 10:
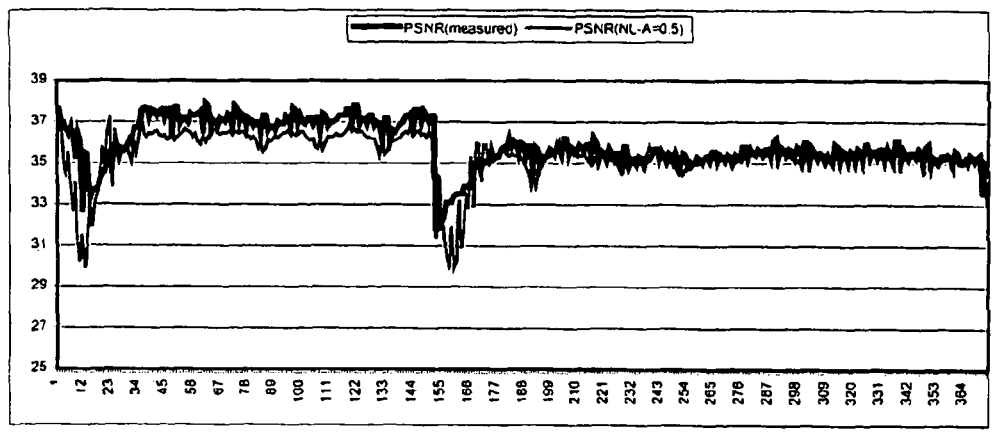
Figure 11:
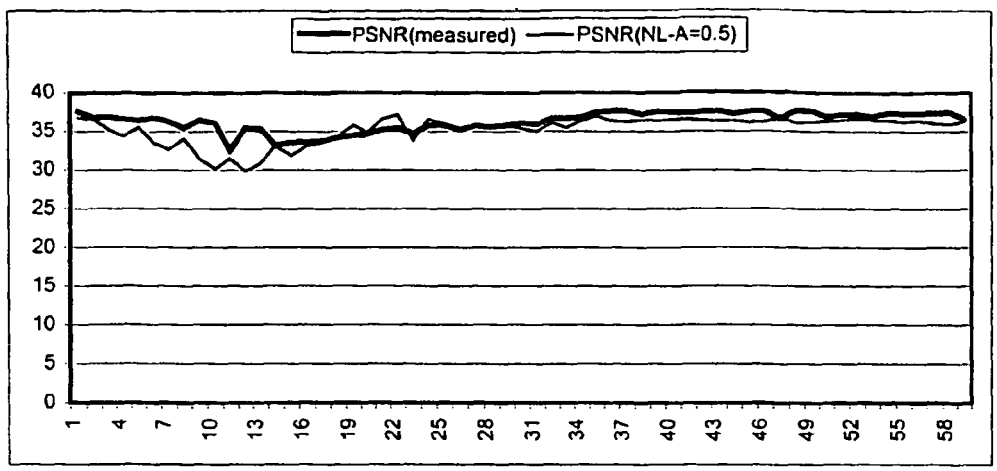

FIG. 10 compares the PSNR of a non-uniform distribution, with the modified B-picture quantiser step sizes, against the measured value. As we see, the PSNR is now much smoother, and its variation at a finer scale is shown in FIG. 11.

Thus, so far we have shown that the quantiser step size can act in a similar manner to the mean squared error (PSNR) in the reference model. Since it is believed that the mean squared distortion should take into account the human visual system response to be a more reliable quality metric, so should the No-reference model. In the following we show how the required parameters for the No-reference model can be extracted from the compressed bitstream.

Viewers tolerate more distortions at the detailed areas of the pictures or near the edges. This is known as spatial masking of the human visual system. Thus the impact of the quantiser step size on picture quality at these areas can be reduced by the amount of spatial details.

Picture details, or spatial complexity can also be derived from the bitstream. This can be done by counting the number of non-zero quantised coefficients per coded block in the bitstream. This is because, the higher the spatial details in a picture, the image energy is more distributed among the coefficients.

Horizontal, vertical and diagonal edges can also be determined, by inspecting the majority of the quantised non-zero coefficients in each of these directions.

It should be mentioned that this method is reliable up to a point, but loses its strength at higher quantiser step sizes. However, for video quality metrics, this is not important, since at higher quantiser step sizes, pictures become blocky, and the picture blockiness becomes the dominant quality (distortion) indicator, that will be dealt with later.

In the experiments, we have divided the quantiser step size per macroblock, Q, by the spatial complexity factor X, derived from the number of non-zero coded coefficients. For example X can be 1, 1.2, 1.4 and 1.6 if the number of non-zero coefficients per block in the zigzag scan order are less than 3, 6, 10 or 15 respectively, and 1.8 otherwise (this is an approximation: a more sophisticated approach to finding proper values would take the MB-type into account, since in INTRA MBs, more coefficients per block are coded than the INTER ones). Thus so far the quality metric for a picture is the average of this modified quantiser step size in that picture.

$$Q_x = \sum_{frame} \frac{Q}{X} \quad (8)$$

Our crude subjective comparison between the visual quality of the pictures and $Q_x$ per picture shows a very strong correlation. This was done by running a segment of coded video with a pointer pointing to the frame coded (unfortunately it just shows I-pictures), against a graph of $Q_x$ per picture.

Similar to spatial masking, motion of distorted objects might have different appearances, depending on the amount of motion (temporal masking). The motion vectors in the bitstream can be extracted and used as a gauge for motion in the picture. We have used the motion magnitude, defined as:

$$V=\sqrt{v_x^2+v_y^2} \qquad (9)$$

for each macroblock (MB) and then averaged them over the entire frame, to be used as an indication of amount of motion per picture. In deriving the motion magnitude from the bitstream, care has to be taken considering the picture type. For example, since the motion vectors in P-pictures refer to the previous anchor picture, then their magnitudes should be divided by 3 (we have used the GoP format of M=3, N=12, that is the anchor pictures are 3 frames apart and the period of I-pictures is 12 frames). In B-pictures, for the $B_1$-picture, the forward motion vector is used directly but the magnitude of the backward motion vector should be divided by 2. The reverse applies to the $B_2$-pictures. Of course there would not be any motion vector for I-pictures, but this does not mean that I-pictures do not have any motion.

In the experiment, as a movement indicator for the sequence, we just used the motion magnitude derived from the P-pictures. This works well, since changes in motion are much slower than the frame rate, and that of P-pictures can be used for the other frames in the sequence. Note that, at scene cuts, there would not be any motion vector for the P-pictures. Therefore a method of detecting scene cuts from the bitstream is highly desirable. This will be dealt with below.

Having found the motion value, the question then is of how it can be used to modify the video quality metric. The best way to see how it is used is in the full reference model. In our experiments, we have used a simple model that reduces the impact of distortion according to the strength of motion. This is not an optimum model, since certain distortions, like blockiness and distortions at the edges, may be more visible at higher speeds than say at mid speeds.

In our model, considering the quantiser step size, spatial and temporal masking, the quality metric QM so far is defined as:

$$QM = \frac{Q_x}{\log_{10}(10+V)} \qquad (10)$$

where $Q_x$ is the spatially modified average quantiser step size per frame and V is the magnitude of motion per frame.

Figure 12:
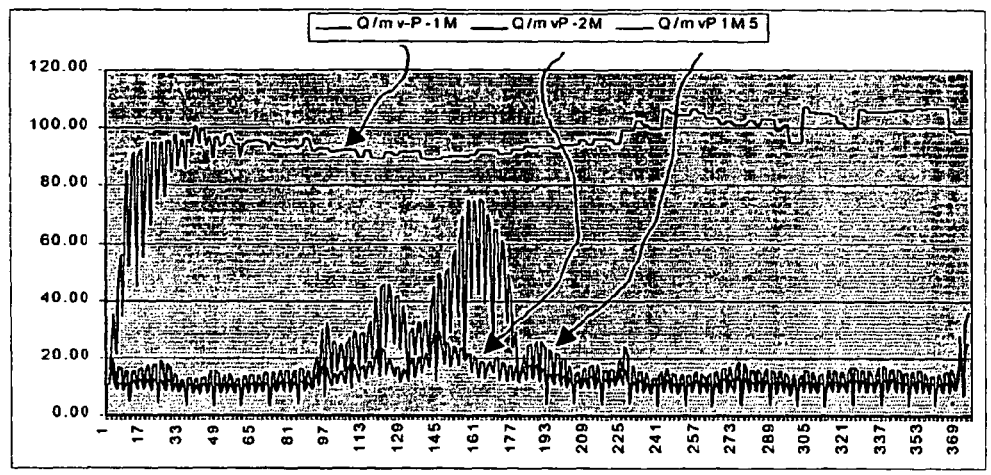

Running a segment of video against the Quality Metric (QM) curve of the "Scorpion" sequence, at 1, 1.5 and 2 Mbit/s, shown in FIG. 12, shows a strong correlation.

Viewers can tolerate larger distortions at the darker and brighter areas of pictures than at mid ranges. This is known as contrast sensitivity of the human visual system. Thus the average intensity of the pixels within a frame can be used to modify the quality metric indicator to compensate for the contrast sensitivity.

The DC coefficient of each INTRA coded block represents the DC or the average values of the quantised pixels in that block. Thus extracting the DC coefficients of an I-picture, where all the blocks are intra coded, can indicate the overall intensity of an I-picture. Of course this cannot be applied to P and B-pictures, since they are mainly predictively coded. However, like motion, since picture darkness does not change fast, then that of an I-picture may be sufficient to be representative of the whole pictures in that group of Pictures (GoP).

Note that extracting the DC values in I-pictures should be done with some care. The fact is that in most cases the DC coefficients are spatially predicted from their neighbouring DC values, and hence they should be decoded properly. However, this does not mean to inverse transform the coefficients, but adding to their predicted DC coefficients.

Turning now to the "blockiness" detection, at low bit rates, or larger quantiser step sizes, pictures become blocky. Although the quantiser step size is responsible for picture blockiness, it cannot be directly used as a blockiness indicator. For example, while in the plain areas of the picture some small quantiser step sizes may show picture blockiness, in the detailed areas even moderately larger quantiser step sizes may not show any blockiness, albeit some picture details can be lost.

For the compressed bitstream to indicate whether a picture is blocky or not, one has to know why pictures become blocky.

In general picture blockiness depends on the MB-type. If a macroblock is INTRA coded, then if the DC coefficient is the only non-zero coefficient of this block, such a decoded block appears blocky. This is because, all the 8×8=64 pixels of the block are reconstructed from a single value (DC) and all will be equal. On the other hand, if more coefficients are coded, then pixel values within the block will be different from each other and block does not look blocky. Thus INTRA coded blocks of all picture types can lead to blockiness, provided the blocks have only DC coefficients and all the AC coefficients are zero.

Note that INTER coded blocks (of P and B-pictures) with only a DC coefficient may not cause blockiness. This is because, even though the reconstructed frame difference for that block may have equal values, when added to their prediction, provided the prediction block is not blocky, the reconstructed pixels do not appear blocky. Blockiness may also be created in the other MB-types. This is of course picture dependent. For example in P-pictures, a non-coded MB has all the coefficients set to zero (cbp=0), but the motion vector is non-zero. In this case at the decoder all the 16×16 pixels of the MB are copied from the previous frame, displaced by a motion vector. Since values and directions of the motion vectors change from frame to frame, then copying of these blocks creates some edges around the MB boundaries that make the picture look blocky, although this type of blockiness is less disturbing than the one described earlier.

In P-pictures the Skipped MBs might also lead to blockiness. In these pictures, if all of the quantised coefficients in a MB are zero (cbp=0), and also the motion vector is zero, the MB is skipped (except the first and last MB in a slice, which will be treated as non-coded). The decoder takes no action on these MBs, and hence these parts of the picture are not updated (direct copy from the previous frame). Thus, if the previous picture at that position is blocky, it is transferred to the current picture.

In B-pictures, the non-coded and skipped MBs are different from those of P-pictures. In this picture-type a skipped MB not only has a cbp=0, but also has to have the same motion prediction (the same value of motion and the direction of prediction) of its adjacent MB. Thus the decoded MB of this type copies a 16×16 pixels of the MB from the previous frame, displaced by some motion vector, hence creating blockiness. The non-coded MBs in B-pictures are the ones with cbp=0, but the direction of prediction or its motion vector is not the same as its immediate neighbouring MB. Thus non-coded MBs can also lead to blockiness.

It should be noted that, even non-coded blocks (blocks with all the coefficients zero) of a MB with non-zero coded block pattern (cbp), can lead to blockiness. This is because, for these blocks, pixels from the previous frame are copied, and if motion vectors point in different directions from frame to frame, or when the previous block is itself blocky, they can appear blocky.

In summary, all types of macroblocks can lead to blockiness. However, skipped and non-coded MBs can cause blockiness if the predicted picture is blocky, otherwise they do not cause any problem. The only situation that is certain to cause blockiness is an INTRA coded MB with only one non-zero coefficient in a block, which has to be the DC one. Thus a more reliable method for blockiness detection is to look for INTRA coded MB-type, and if any of its blocks has only a DC coefficient (all the AC coefficients are zero), that MB is marked blocky. The percentage of INTRA coded blocks with only DC coefficients over the total number of coded blocks (Inter and intra) is then defined as a measure of blockiness. To consider the impact of skipped and non-coded MBs on blockiness, the blockiness status of all the MBs in a frame are recorded, and updated from frame to frame. Hence if at frame N, an MB is either skipped or non-coded, provided that it was blocky in frame N-1, it is now declared blocky. The blockiness status of the MB changes, when it is coded, and of course remains blocky if any of its INTRA coded blocks have only DC coefficients. Thus the overall percentage of the blockiness should be recalculated accordingly. However, since we have not implemented the impact of skipped and non-coded MB on the blockiness, we may consider the sum of INTER and INTRA coded blocks with only DC coefficients. Including INTER coded blocks, may be to extent compensate for the lack of skipped and non-coded MB.

Figure 13:
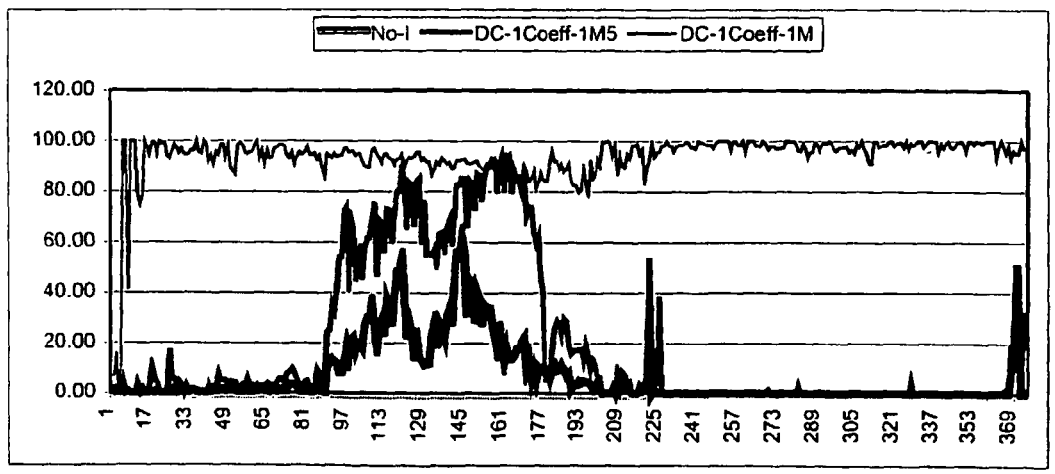

FIG. 13 plots the blockiness of the "Scorpion" sequence encoded at 1, 1.5 and 2 Mbit/s. In this figure, the impact of the skipped and non-coded MBs has not been taken into account, but instead the sum of inter and intra coded blocks with only DC coefficients is considered. Subjectively, the picture is blocky throughout the sequence at 1 Mbit/s. At 2 Mbit/s, there is no blockiness in the picture. At 1.5 Mbit/s, picture is blocky at the middle, and non-blocky in the other parts. These all agree with the blockiness indicator, also shown in FIG. 13.

Note that in this graph the influence of Skipped and Non-coded MBs has not been taken into account. They may be considered, since if there are too many Skipped and Non-coded MBs (this happens at lower bit rates) in P and B-pictures, then they cannot have too many INTRA coded MBs. This will reduce the reliability of the detector for these pictures. The larger the proportion of the Skipped and Non-coded Mb, the less reliable is the detector.

Scene changes (cuts) can affect the subjective quality of pictures, and hence the quality metric model. For example, due to a scene cut, the average luminance of the new scene might be very different from the previous scene. The notion of motion also changes at the scene cuts, and there are some other effects. For P-pictures, since at scene cuts MBs are mainly Intra coded, this reduces the number of inter coded Mb and hence the motion vectors per P-pictures, that may lead to wrong motion strength measurements.

The fact is that scene cuts can also be detected from the bitstream. However, the mechanism of detection is picture-type dependent. Considering that from the picture header the picture-type is known, then the scene cut for various picture types can be detected in the following manner.

In P-pictures, scene cuts are reliably detected by calculating the proportion of INTRA coded MBs. This is because, at scene cuts, frame difference signals can have larger energy than the intra MBs, and hence the encoder normally codes them in INTRA mode.

In B-pictures, one has to look at the proportion of the forward, backward and interpolated motion vectors. This is because, when a scene cut occurs at a B-picture, then the picture belongs to the new scene and the majority of the motion vectors will be backward (they point to the future anchor picture). More importantly, the number of interpolated ones will be very small, or perhaps nil. Thus a measure of certainty of detecting a scene cut would be the ratio of backward to forward motion vectors. Or their percentage within the picture that has to be very high for the backward, but very small for the forward and specially the interpolated one.

We can even determine whether the scene cut had occurred in the first or in the second B-picture. This can be done by comparing the ratio of the forward and backward motion vectors of the two B-pictures jointly. That is, if both B-pictures have mainly backward motion vectors, this means that both B-pictures belong to the new scene. Hence scene cut should have occurred in the first B-picture. On the other hand, if one has mainly forward (which is the first picture) and the other one mainly backward, the scene cut should have occurred in the second B-picture. This happens, because the first B-picture belongs to the old scene and the second B-picture belongs to the new scene.

We can even detect scene cuts at I-pictures. To do this one has to look at the proportion of the forward/backward motion vectors of its two previous B-pictures. If scene cut occurs at an I-picture, then the majority of the motion vectors of its two previous B-pictures will be forward. Thus if both B-pictures have mainly forward motion vector, then there is a scene cut in the future anchor picture, that can be a P or an I-picture. This information plus the picture type will determine whether scene cut had occurred in an I- or a P-picture. The previously mentioned method of detecting scene cuts at P-pictures (proportion of INTRA coded MB) can be combined with this to improve the reliability of detecting scene cuts on P-pictures.

Detection of scene cuts from the compressed bitstream is useful for the accuracy of temporal masking. For example, we know that at scene cuts P-pictures are mainly INTRA coded, and hence there will not be sufficient motion vectors in the P-picture bitstream to be used in temporal masking. However, detecting that this is a scene cut, then one might ignore the extraction of motion vectors for this picture and use the previous value.

Figure 14:
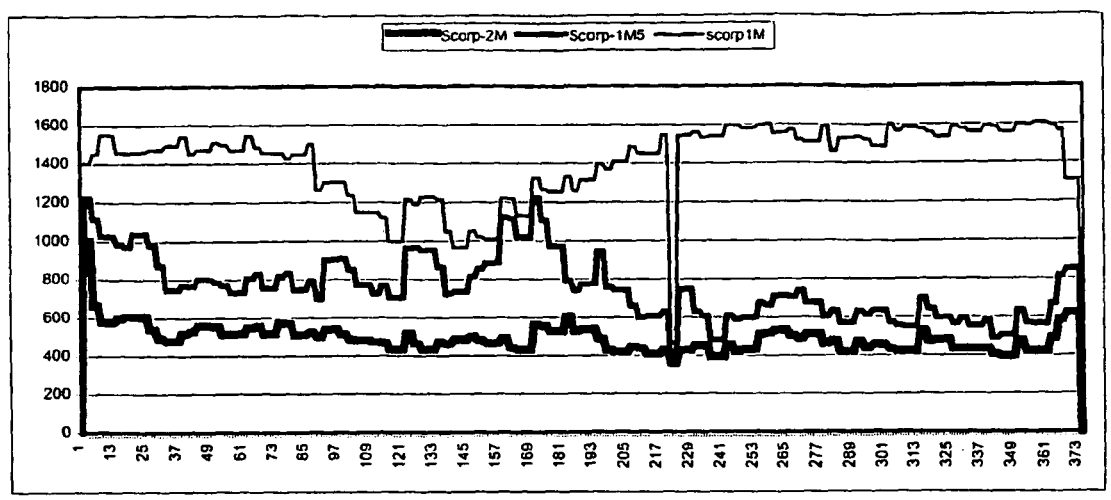

FIG. 14 shows the number of sum of the skipped and non-coded macro blocks of P-pictures (I-pictures do not have any) of the Scorpion sequence at 1, 1.5 and 2 Mbit/s. For the purpose of presentation this number is repeated for the other picture types. Inspection of this graph reveals, first of all, these values on their own cannot determine blockiness, however, their numbers are so significant that can affect the accuracy of blockiness detector (e.g. depends what percentage of previous frame was blocky). Second, as we see at all bit rates, this number is significantly reduced at frame around 218, which is a scene cut. Thus in P-pictures small number of skipped and non-coded MBs can be an indication of a scene cut.

A Video Quality Metric (VQM) can be realised in various forms. One way is to separate the blockiness which is the main distortion of the block based encoders from the other distortions. In the event of strong blockiness, then the video quality (distortion) is solely determined by the strength of the blockiness. On the other hand, for higher quality video, a perceptual model is used.

The quantiser step size is the main parameter of the perceptual model. It is preferably modified by the spatial, temporal activity and the contrast sensitivity parameters in the pictures as a quality indicator.

Both the blockiness and perceptual indicators can be derived for each frame. The resultant values may be used for continuous monitoring of video quality. For a video segment (e.g. 10 sec long), the per frame quality indicators might be integrated to represent a single value of video quality. This value can be compared with the subjective test results, to justify the validity of the model.

What is claimed is:

1. A machine-implemented method of generating a measure of quality for a digital video signal that has been encoded using a compression algorithm utilizing a variable quantizer step size and a two-dimensional transform, such that the encoded signal includes a quantizer step size parameter and, for blocks of the picture, transform coefficients, the method comprising using at least one signal processor having an input which receives said encoded video signal and an output which provides data representing said measure of quality, said at least one processor being configured to:
   a) generate a first quality measure which is a function of said quantizer step size parameter;
   b) generate a second quality measure which is a function of the number of blocks having a single transform coefficient; and
   c) combine the first and second measures to produce said output measure of quality;
   wherein the second quality measure is determined as a function of the number of blocks determined to be blocky,
   (i) wherein a block is defined as blocky if the block has been encoded without reference to an earlier frame of the picture and the block has only one transform coefficient; and
   (ii) wherein a block is defined as blocky if it has been encoded by reference to an earlier frame of the picture and the block has no transform coefficients and the corresponding block of the respective earlier picture has also been defined as blocky.

2. A machine-implemented method of generating a measure of quality for a digital video signal that has been encoded using a compression algorithm utilizing a variable quantizer step size and a two-dimensional transform, such that the encoded signal includes a quantizer step size parameter and, for blocks of the picture, transform coefficients, the method comprising using at least one signal processor having an input which receives said encoded video signal and an output which provides data representing said measure of quality, said at least one processor being configured to:
   a) generate a first quality measure which is a function of said quantizer step size parameter;
   b) generate a second quality measure which is a function of the number of blocks having a single transform coefficient;
   c) combine the first and second measures to produce said output measure of quality; and
   d) make a spatial masking adjustment to said first measure, said adjustment being a function of a spatial complexity factor calculated as a function of the number of nonzero transform coefficients per encoded block.

3. A machine-implemented method of generating a measure of quality for a digital video signal that has been encoded using a compression algorithm utilizing a variable quantizer step size and a two-dimensional transform, such that the encoded signal includes a quantizer step size parameter and, for blocks of the picture, transform coefficients, the method comprising using at least one signal processor having an input which receives said encoded video signal and an output which provides data representing said measure of quality, said at least one processor being configured to:
   a) generate a first quality measure which is a function of said quantizer step size parameter;
   b) generate a second quality measure which is a function of the number of blocks having a single transform coefficient; and
   c) combine the first and second measures to produce said output measure of quality;
   wherein the method is for use with signals encoded using a compression algorithm utilizing motion compensation, such that the encoded signal also includes motion vectors, the method including making a temporal masking adjustment to said first measure, said adjustment being a function of the motion vectors in each encoded block.

4. A machine-implemented method of generating a measure of quality for a digital video signal that has been encoded using a compression algorithm utilizing a variable quantizer step size and a two-dimensional transform, such that the encoded signal includes a quantizer step size parameter and, for blocks of the picture, transform coefficients, the method comprising using at least one signal processor having an input which receives said encoded video signal and an output which provides data representing said measure of quality, said at least one processor being configured to:
   a) generate a first quality measure which is a function of said quantizer step size parameter;
   b) generate a second quality measure which is a function of the number of blocks having a single transform coefficient: and
   c) combine the first and second measures to produce said output measure of quality;
   wherein the step (c) comprises:
   a) translating the first and second measures to a common scale;
   b) in the event that the second measure is representative of a picture quality inferior to a threshold value, outputting the second measure; and
   c) otherwise, outputting the first measure.

5. An apparatus for generating a measure of quality for a video signal that has been encoded using a compression algorithm utilizing a variable quantizer step size and a two-dimensional transform, such that the encoded signal includes a quantizer step size parameter and, for blocks of the picture, transform coefficients, the apparatus comprising:
   a) means for generating a first quality measure which is a function of said quantizer step size parameter;
   b) means for generating a second quality measure which is a function of the number of blocks having a single transform coefficient; and
   c) means for combining the first and second measures;
   wherein the means for generating the second quality measure is arranged to produce a measure that is a function of the number of blocks determined to be blocky,
   (i) wherein a block is defined as blocky if the block has been encoded without reference to an earlier frame of the picture and the block has only one transform coefficient; and
   (ii) wherein a block is defined as blocky if it has been encoded by reference to an earlier frame of the picture and the block has no transform coefficients and the corresponding block of the respective earlier picture has also been defined as blocky.

6. An apparatus for generating a measure of quality for a video signal that has been encoded using a compression algorithm utilizing a variable quantizer step size and a two-dimensional transform, such that the encoded signal includes a quantizer step size parameter and, for blocks of the picture, transform coefficients, the apparatus comprising:
   a) means for generating a first quality measure which is a function of said quantizer step size parameter;
   b) means for generating a second quality measure which is a function of the number of blocks having a single transform coefficient;
   c) means for combining the first and second measures;
   d) means for calculating a spatial complexity factor as a function of the number of nonzero transform coefficients per encoded block, and
   e) means operable to make a spatial masking adjustment to said first measure, said adjustment being a function of said spatial complexity factor.

7. An apparatus for generating a measure of quality for a video signal that has been encoded using a compression algorithm utilizing a variable quantizer step size and a two-dimensional transform, such that the encoded signal includes a quantizer step size parameter and, for blocks of the picture, transform coefficients, the apparatus comprising:
   a) means for generating a first quality measure which is a function of said quantizer step size parameter;
   b) means for generating a second quality measure which is a function of the number of blocks having a single transform coefficient; and
   c) means for combining the first and second measures;
   wherein the apparatus is for use with signals encoded using a compression algorithm utilizing motion compensation, such that the encoded signal also includes motion vectors, the apparatus further including:
   means operable to make a temporal masking adjustment to said first measure, said adjustment being a function of the motion vectors in each encoded block.

8. An apparatus for generating a measure of quality for a video signal that has been encoded using a compression algorithm utilizing a variable quantizer step size and a two-dimensional transform, such that the encoded signal includes a quantizer step size parameter and, for blocks of the picture, transform coefficients, the apparatus comprising:
   a) means for generating a first quality measure which is a function of said quantizer step size parameter;
   b) means for generating a second quality measure which is a function of the number of blocks having a single transform coefficient; and
   c) means for combining the first and second measures;
   wherein the means for combining the measures comprises:
   means for translating the first and second measures to a common scale, and
   means operable in the event that the second measure is representative of a picture quality inferior to a threshold value, to output the second measure and, otherwise, to output the first measure.

* * * * *